United States Patent [19]

Steffens et al.

[11] Patent Number: 4,946,217
[45] Date of Patent: Aug. 7, 1990

[54] PICKUP BOX COVERS

[75] Inventors: Charles J. Steffens, Grand Rapids; John Kooiker, Caledonia, both of Mich.

[73] Assignee: Steffens Enterprises, Inc., Grand Rapids, Mich.

[21] Appl. No.: 380,396

[22] Filed: Jul. 17, 1989

Related U.S. Application Data

[63] Continuation-in-part of Ser. No. 140,533, Jan. 4, 1988, Pat. No. 4,844,531.

[51] Int. Cl.⁵ ............................................... B60P 7/02
[52] U.S. Cl. .................................... 296/100; 16/251
[58] Field of Search .................. 296/100; 160/32, 35, 160/36, 130, 187, 229.1; 16/251

[56] References Cited

U.S. PATENT DOCUMENTS

| | | | |
|---|---|---|---|
| 3,651,540 | 3/1972 | Rana | 16/251 |
| 4,199,188 | 4/1988 | Alarecht et al. | 296/100 |
| 4,221,423 | 9/1980 | Stone | 296/100 |
| 4,418,954 | 12/1983 | Buckley | 296/100 |
| 4,747,441 | 5/1988 | Apolzer et al. | 296/100 |

Primary Examiner—Robert R. Song
Attorney, Agent, or Firm—Prince, Heneveld, Cooper, DeWitt & Litton

[57] ABSTRACT

A low silhouette cargo bay cover for pickup trucks and the like includes an angle member mounted on the cargo bay sides equipped with a flexible gasket to form a seal with the cover. The cover has a special narrow panel adjacent the cab to make it possible to more completely expose the cargo area of the turck and improved seal means at each of the hinges to more effectively exclude moisture.

9 Claims, 4 Drawing Sheets

4,946,217

PICKUP BOX COVERS

This application is a continuation-in-part of application Ser. No. 140,533 entitled FOLDING COVER FOR PICKUP BOX, filed Jan. 4, 1988, now U.S. Pat. No. 4,844,531.

FIELD OF THE INVENTION

This invention relates to covers for the cargo bed of a pickup truck, more particularly to such a cover consisting of a plurality of rigid panels which may be folded accordion style to uncover the interior of the cargo space.

BACKGROUND OF THE INVENTION

The cargo space of the conventional pickup truck is open and, therefore, unprotected from the weather. This can be a serious problem in the case of various types of cargo. This problem has been addressed in a number of ways in the past. One solution has been to provide a flexible cover of watertight material such as canvas which has been treated with a moisture sealing material or a plastic. Means are provided on the sides of the cargo space to tie down the cover. In this arrangement, access to the cargo space is attained by detachment and removal of the flexible cover.

Another solution has been to provide a rigid roof structure which is placed over the cargo bay and bolted, clamped or otherwise rigidly secured to the cargo bay. This type of structure normally has a rear door which is positioned above and cooperates with the tailgate of the cargo space. Access to the cargo area of the truck bed is exclusively through the rear opening provided by pivoting the rear door and tailgate panel to open position.

A still further solution has been a flexible cover supported on rigid cross pieces which are mounted on rails secured t the sides of the cargo space for fore and aft movement. This latter type of cover can be folded forwardly against the rear wall of the vehicle cab to expose the cargo bay.

Each of these solutions has a number of variations incorporating the basic structural and functional principles described above. All of them have the disadvantage of complexity, operational inconvenience and relatively high cost.

BRIEF DESCRIPTION OF THE INVENTION

The invention provides a plurality of low silhouette panels which are relatively lightweight and can be quickly and easily folded, one upon the other, to expose the top of the cargo bay and just as easily be unfolded to cover the cargo bay. Only the forward one of the panels needs to be secured to the vehicle because the low silhouette eliminates the problem of opening of the cover due to lifting of the panels by the vehicle's slip stream even at high speeds. Further, the invention provides a low silhouette barrier which acts as a shield to protect the closed cover from laterally acting forces, such as cross wind, trying to dislocate it sideways. Because of its construction and low silhouette, the individual panels can be relatively lightweight, thus, making it readily maneuverable by a single operator. Because of its low silhouette, even when folded into cargo bay open position, it provides a compact stack which is not, or only slightly, affected by the vehicle's slip stream and remains below the vehicle's rear window and, thus, does not obstruct it.

The invention provides an improved seal at the joints between each of the panels to make the cover form a truly watertight seal. It also provides an improved gasket arrangement to prevent moisture finding its way into the cargo bay from the space between the wind guard which extends along the side of the truck adjacent the ends of the panel. It also provides better sealing means at the ends of the hinges to further isolate the interior of the cargo bay from the exterior elements to which the truck can be expected to be exposed.

The invention disclosed in this application provides a panel construction which has an improved moisture seal between the cover and the truck body and permits the cover to be so folded that even more of the cargo bay can be exposed when needed. It also provides an improved weather seal at the hinges.

These and other improvements and advantages of the invention by those skilled in the art of convenience accessories for pickup trucks upon reading the following drawings and description of the invention.

DESCRIPTION OF THE PREFERRED EMBODIMENT

Figure 1:
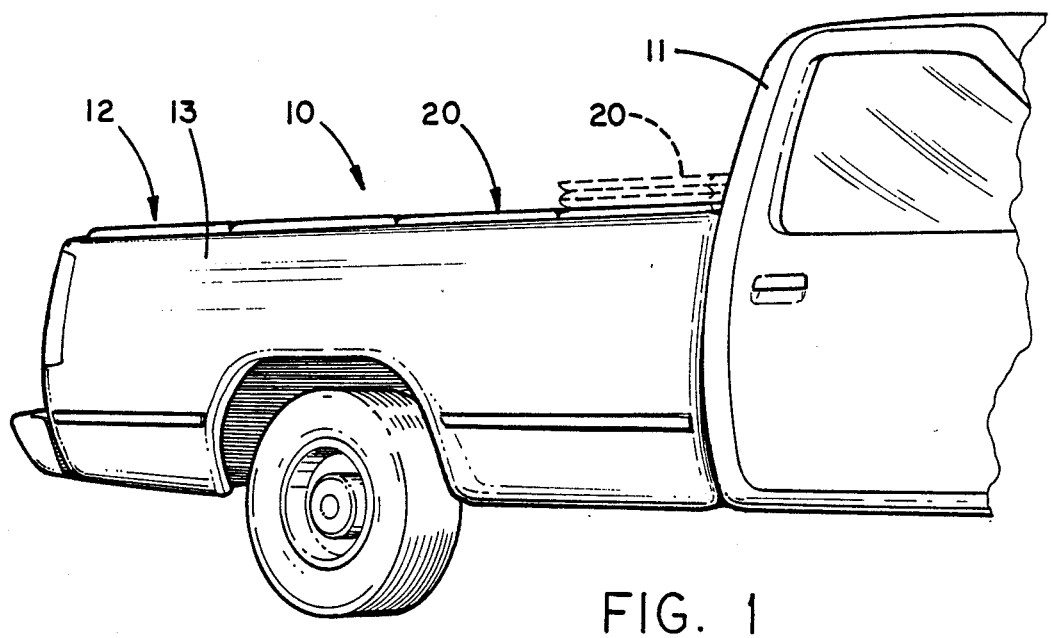
FIG. 1 is a fragmentary oblique side view of a pickup vehicle with the cover of this invention illustrated in extended condition in solid lines and in folded condition in broken lines (side wind barrier omitted)
Figure 3:
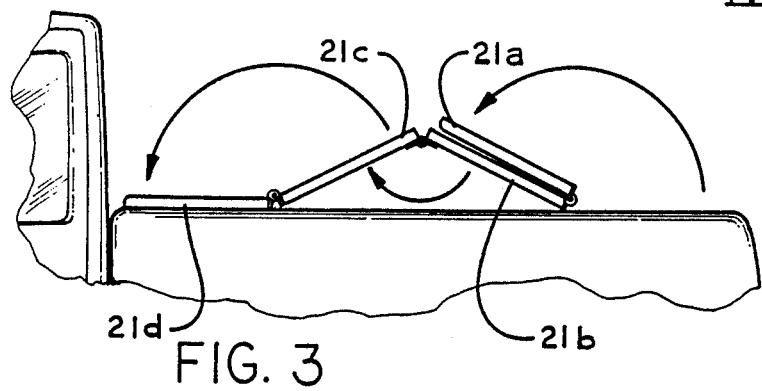
FIG. 3 is a view similar to FIG. 2 illustrating the folding of one form of the cover.
Figure 11:
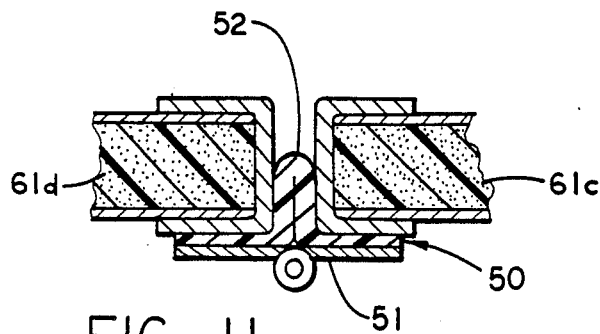
FIG. 11 is a fragmentary sectional view similar to FIG. 9 but illustrating the hinged joint where the hinge is on the interior of the cover when the cover is closed.
Figure 12:
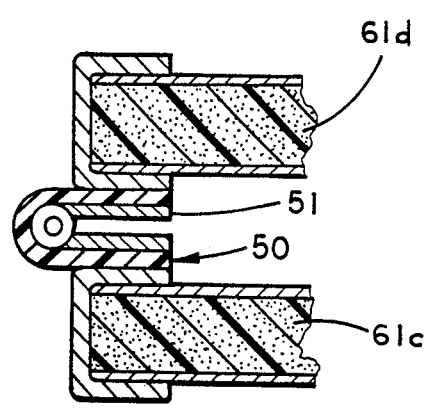
FIG. 12 is a elevational view of the hinge joint illustrated in FIG. 11 when the panels are folded to storage.

The numeral 10 indicates a conventional pickup truck equipped with a cab 11 and a cargo bed or area 12 having a pair of sides 13 and a fold-down tailgate. Mounted over the otherwise open top of the cargo space of the cargo bed is the cover 20 which, in FIG. 1, is illustrated in extended or cargo space closing position in solid lines and in retracted or cargo space open position in broken lines (FIG. 1). In the construction disclosed in application Ser. No. 140,533, the cover 20 consists of several, preferably four, identical panels 21a, b, c and d which are joined to each other by hinges 22. The hinges 22 each have a central pin 23 (FIGS. 9 and 11) about which the leaves of the hinge pivot. The hinges are secured to the covers by suitable fastener means such as screws. The hinges joining panels 21a and 21b and 21c and 21d are arranged with the central pin 23 of the hinge extending along one lateral edge of a panel and centered in the plane of the adjacent surface of the panel. The central pin of the hinge between the panels 21b and 21c is displaced slightly below the lower surface of the panels (FIG. 11). Thus, adjacent panels fold in opposite directions (FIG. 3).

To protect the cover from cross wind, a generally L-shaped angle 30 is secured to the top of the sides 13 of the cargo bed to serve as a shield for the edges of the panels. In this improved construction, the angle 30 can be an aluminum extrusion with its upright leg 31 slightly inwardly inclined to partially close the gap between it and the ends of the adjacent panels. For the purpose of giving it a smooth top surface and also stiffen it, the end of the leg 31 can be provided with a bead 32.

Figure 6:
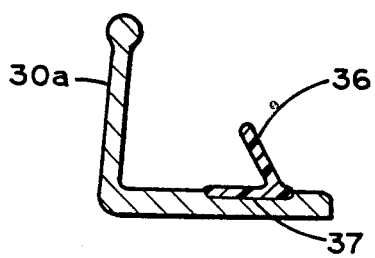
FIG. 6 illustrates the same wind barrier as FIG. 5 with a modified gasket construction.
Figure 7:
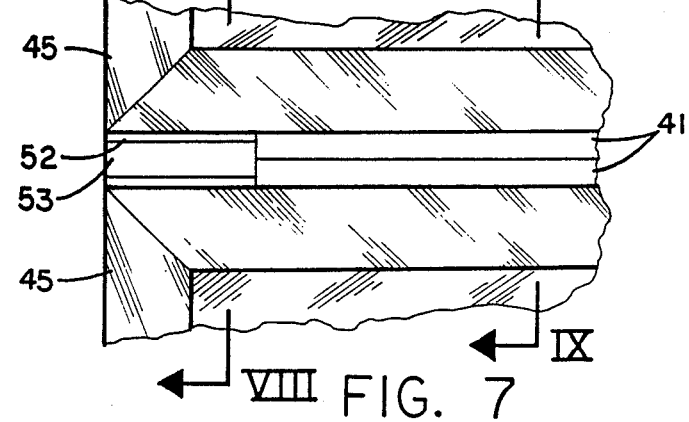
FIG. 7 is a fragmentary view of the bottom face of the cover at one of the second or third hinges.

The leg 33 of the angle is provided with an inverted T-shaped channel 34 to mount a resilient gasket 35. The gasket has an upstanding finger 36 and a base flange 37 which is seated in the lower portion of the channel 34. By properly dimensioning the channel and the gasket and using a material having some lubricious surface characteristics, or is coated with a lubricious material for purposes of installation, the gasket can be assembled to the angle 30 by sliding it lengthwise of the channel. FIG. 6 illustrates a modified construction in which the base flange 37 of the gasket is only partially recessed into the top surface of the bottom leg of the angle 30a. In this case, the gasket is bonded to the angle 30 by any suitable weather resistant bonding agent, the choice of which will depend upon its ability to adhere to both aluminum and the plastic from which the gasket 35 is extruded. Various adhesives suitable for this purpose are commercially available.

Figure 4:
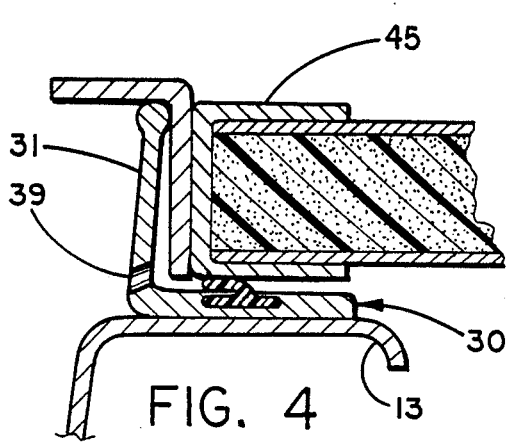
FIG. 4 is an enlarged, fragmentary, sectional view through one side of the truck body illustrating a modified construction for this invention installed in cargo compartment closing position.
Figure 5:
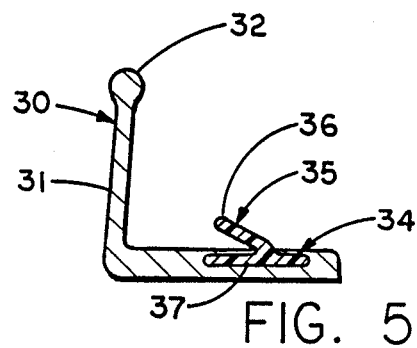
FIG. 5 is a sectional view of the angle forming a wind barrier and equipped with a moisture excluding gasket.

The angle at which the finger 36 extends upwardly will, in part, depend upon the resilience of the gasket. The important point is that it form a seal with the closed cover. It is important that the finger 36 be inclined outwardly, thus providing a seal which is particularly resistant to moisture migration between the seal and the cover. To avoid accumulation of moisture within the angle 30 between the upright leg 31 and the gasket 35, drain openings 39 may be provided at suitable spacings at the base of the upright leg 31 (FIG. 4). These openings may be inclined rearwardly in an outward direction to create an outward flow pattern.

Figure 9:
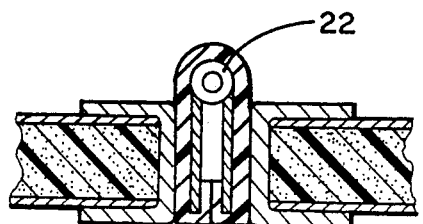
FIG. 9 is a fragmentary sectional view taken along the plane IX—IX of FIG. 7.
Figure 10:
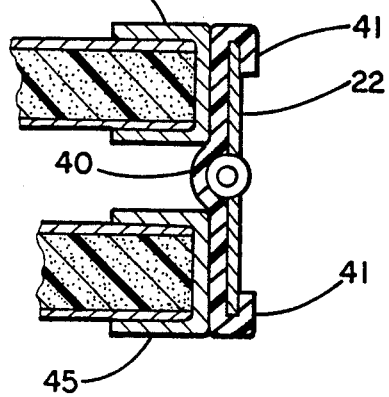
FIG. 10 is a fragmentary sectional view of the panel joint of FIG. 9 illustrating the structure when the panels are folded into storage position.

To further resist moisture penetration at the hinges between the panels, the hinges 22 which pivot about an axis which is exterior of the cover when the cover is extended and flat on the truck body are exteriorly covered by a flexible plastic jacket 40 (FIGS. 9 and 10). FIG. 10 greatly exaggerates the space between the panels when they are folded for storage. This jacket preferably has reverse flanges 41 along its edges to seat over and around the ends of the leaves of the hinges 22. These flanges 41 positively anchor the longitudinal edges of the jacket to the hinge. This construction, coupled with the jacket being positioned between the leaves of the hinges and the panels to which the hinge is attached provides a positive anchor for the jacket. This is important because it has been discovered that without this anchor the jacket 40, over a period of time due to opening and closing of the cover, may work its way out of the clamp between the hinge and the cover and ultimately cease to function as a watertight seal. The flanges 41 have proven to be a positive anchor against this occurring.

The preceding description deals with the situation which exists between panels which fold by one of them being pivoted up and over the other about a hinge pin which is external of the cover when the cover is extended to enclose the cargo bay. A different arrangement exists when the panels are folded about a hinge which must have its pivot axis below the panel (FIGS. 8 and 11–13).

Figure 13:
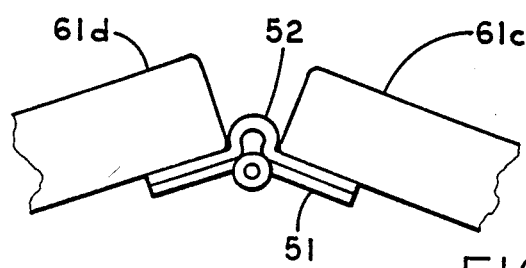
FIG. 13 is a fragmentary end view of the panels illustrated in FIG. 11 as the panels appear when pivoted to partially folded position.

In this panel joint, a flexible seal member 50 is mounted between the hinge 51 and the panels. The seal member 50 has a portion 52 which becomes wedged between the panels when the cover is in extended position. In this position, it also becomes clamped between the panels when they are in aligned position (FIG. 11). The manner in which the seal moves as the panels are folded is illustrated in FIG. 13.

Figure 8:
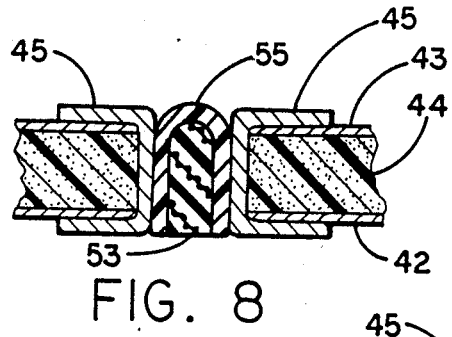
FIG. 8 is a fragmentary sectional view taken along the plane VIII—VIII of FIG. 7.

Because the hinge 51 extends inwardly from the panels when they are aligned, this hinge cannot extend to the ends of the panels where it would interfere with the panels laying flat on the gasket 35 at the sides 13 of the cargo bay. To overcome this problem, where the hinge terminates, an inverted U-shaped gasket 55 is provided (FIG. 8). Since there is no hinge or other pressure creating medium in this area, a compressible member 53, such as a rubber gasket, is provided. This is bonded to one leg of the gasket 55 and is of a thickness such that when the panels are aligned, it is compressed as illustrated in FIG. 8.

The panels 21 are of a laminar construction having inner and outer sheets 42 and 43 and a core 44 or rigid foam. The inner and outer sheets are preferably of aluminum and are bonded to the core. In the construction herein illustrated, each panel is surrounded by a C-shaped frame 45 which protects the edge of the core and adds further rigidity to the panels. The frame 45 can be secured by suitable adhesives to both the facing sheets and to the core which in the construction described in application Ser. No. 140,533 provides a panel having a thickness of from about ⅞ of an inch to slightly more than 1 inch.

Figure 2:
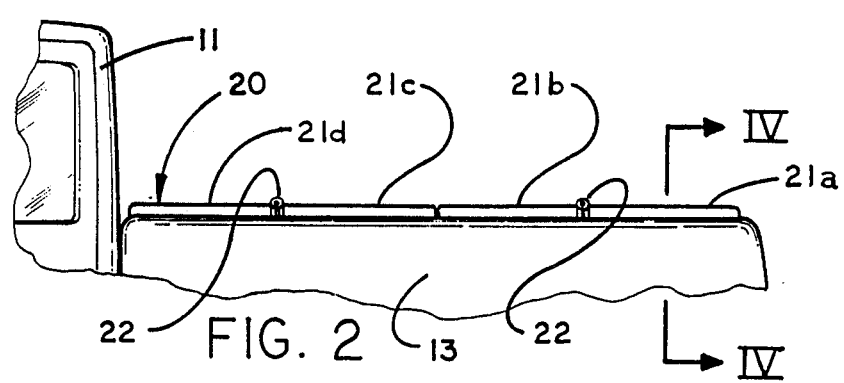
FIG. 2 is a fragmentary side view of the cover in extended condition (with wind barrier omitted)
Figure 14:
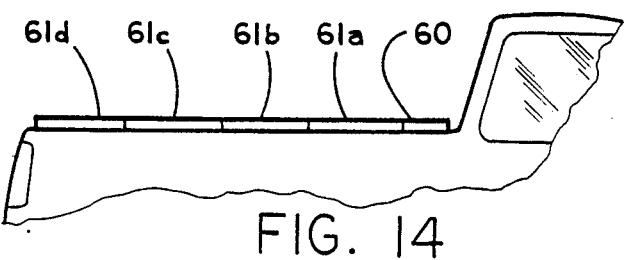
FIG. 14 is a fragmentary, side elevation view of a vehicle equipped with a cover of a modified construction.
Figure 15:
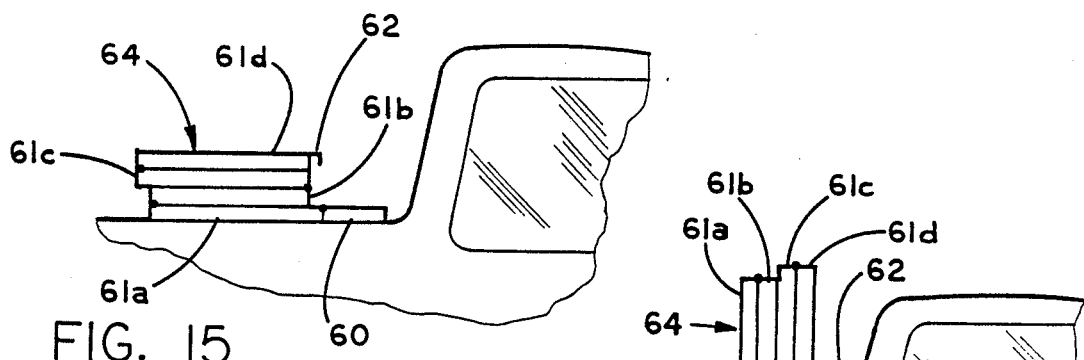
FIG. 15 illustrates the cover shown in FIG. 14 in folded position.
Figure 16:
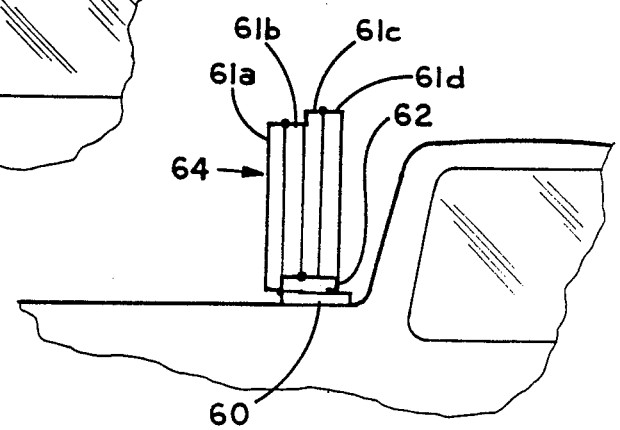
FIG. 16 illustrates the cover shown in FIGS. 14 and 15 pivoted into storage position.

FIGS. 14–16 illustrated a modified construction for the cover. This particular construction is designed for those applications in which additional access to the truck's cargo bay is desired. In this case, the anchor panel 60 adjacent the cab has a width of only 4 or 6 inches, depending upon the length of the cargo bay. The cover is then provided with 4 additional panels 61a, b, c and d hinged to each other in a manner similar to the cover illustrated in FIGS. 2 and 3. It will be observed from FIG. 15 that panels 61a, c and d are of the same width while panel 61b is shorter to provide space for the lock keeper 62 when the panels are pivoted to cargo bay open position. The lock keeper provides a means for locking the cover in closed position as disclosed in application Ser. No. 140,533. As in the case of the cover construction illustrated in FIG. 1, the panels are joined by hinges arranged so that the panels can first be folded into a stack 64, as illustrated in FIG. 15, then the stack 64 pivoted into temporary vertical storage position, as illustrated in FIG. 16. This provides the additional access certain activities require.

Figure 17:
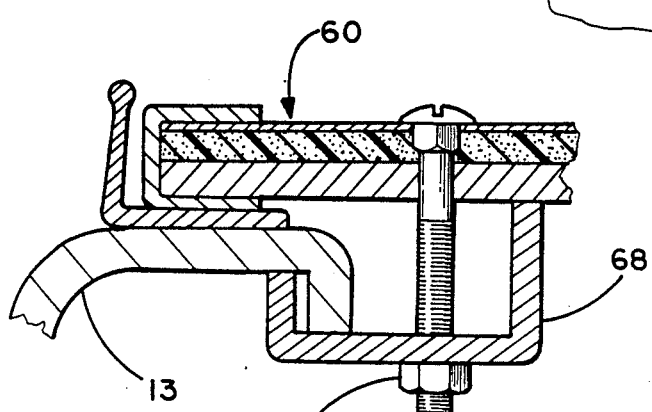
FIG. 17 is an enlarged, fragmentary, sectional view of a means for securing the anchor panel of the cover.

The anchor panel 60 has the same construction as the other panels except its width and the thickness of its lower face sheet, lengthwise of the cargo bed, is only 4 to 6 inches. It can be secured by means of a bolt 67 adjacent each end which cooperates with an inverted, U-shaped bracket 68, one leg of which seats behind the depending flange of the side wall 13 of the cargo bay (FIG. 17). The other leg of the bracket seats against the lower face of the panel. The panel is secured by tightening the nut 69 on the bolt 67. Also, this arrangement makes it a simple and quick operation to either mount or remove the entire cover assembly.

Figure 18:
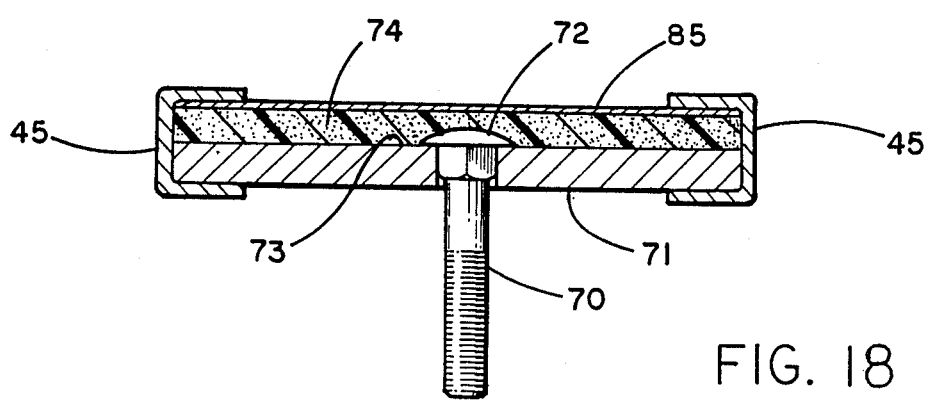
FIG. 18 is a sectional view of a modified construction for the panels.

An alternate construction for mounting the anchor panel 60 is illustrated in FIG. 18. In this arrangement, a bolt 70 is mounted through the lower face member 71 of the panel with its head 72 bearing against the upper face of the bottom sheet 73 of the panel and embedded in the foam core 74 of the panel. The bolt should be of the carriage bolt type with a square shank portion seated in a punched, square hole in the panel so it will be anchored against rotation. The bolts 70 are preferably aligned with the sides of the cargo bay and are seated in suitable openings in the sides and secured by nuts installed from beneath the flanges of these sides.

Figure 19:
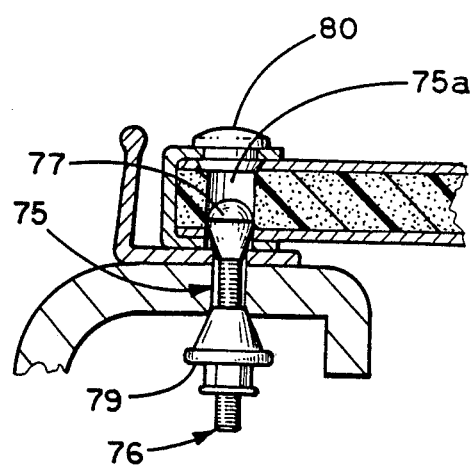
FIG. 19 is a modified construction for an attachment of the anchor panel.

FIG. 19 illustrates a further construction for anchoring the panel 60. In this construction, a hole 75 is provided through the peripheral frame of the anchor panel. The portion 75a of this hole in the upper flange of the frame is large enough to pass the fastener 76 and its upper head 77. The hole is provided through the lower flange of the panel frame, the leg 33 of the angle 30 and the flange 13 of the truck body side is smaller. The fastener also has a lower frusto-conical shaped member 79, which seats against the lower face of the flange 13 on the truck body. The lower one of the members 79 threadedly engages the anchor member and when tightened secures the panel firmly to the truck body. The access opening 75a in the top surface of the panel can be closed by a snap-in plug 80.

All of the above constructions make it possible to remove entirely the cover if desired. At the same time, almost the entire cargo space is open and unobstructed when the cover is open.

FIG. 18 also illustrates a modified construction for the anchor panel. This modified construction utilizes a laminated panel having a top surface formed of a sheet 85 of 25 gauge (0.021") aluminum sheet and a bottom sheet 73 of 0.25" aluminum with an 0.25" core 74 of polystyrene foam. This construction provides a rigid, weather resistant, lightweight panel having a very low silhouette which will form a very compact stack when the top is folded to expose the cargo bay. This panel is more rigid than those previously described because of the thickness of the bottom sheet. However, it still retains the laminated, sandwich construction which gives it resistance to gradually becoming concave due to protracted usage on vehicles travelling poor highways or other surfaces which subject it to repeated and severe vertical movement or vibration of the type which over a period of time will result in permanent deflection of the panel. Such deflection will not only interfere with proper drainage of rain water, it will cause serious difficulty with operation of the hinges, and thus, of opening and closing the cover.

Irrespective of whether the panel construction illustrated in FIG. 4 or that illustrated in FIG. 18 is used, the panels, when in storage position illustrated in FIG. 15, are of a total thickness such that they will not obstruct the vehicle's rear window.

Having described a preferred embodiment of this invention and various modifications thereof, it will be understood that other modifications of this invention can be made. Such modifications are to be considered as included in the hereinafter appended claims unless the language thereof specifically excludes them.

We claim:

1. Means for providing a seal between a foldable cover for a cargo compartment of a truck and the sides of the compartment, said sides having a flat top portion extending the length thereof, said means comprising: a generally rigid L-shaped outer member extending the length of each of said sides and having a horizontal first leg adapted to be seated on and mounted to the top of said sides of the compartment and a second leg extending upwardly from and along the edge thereof remote from the cargo compartment; a resilient seal member having a base leg and a seal forming leg extending upwardly from said base leg, said base leg of said seal being secured to said first leg of said outer member; said seal forming leg being inclined outwardly and upwardly away from the interior of said compartment and adapted to be folded outwardly and downwardly when the cover is seated thereon whereby the plane of contact between the seal and the cover is spaced above the surface to which the seal is attached at least the thickness of the folded leg to positively prevent the entrance of moisture into the compartment.

2. The means for providing a seal as described in claim 1 wherein said base leg of said seal is seated in a recess in the upper surface of said first leg of said L-shaped member.

3. The means for providing a seal as described in claim 1 wherein said base leg of said seal is seated on the surface of said first leg of said L-shaped member.

4. The means for providing a seal as described in claim 1 wherein the upper surface of said first leg of said L-shaped member has a channel recessed therein and opening through a slot in the upper surface thereof for receiving said base leg of said seal member therein, the seal leg of said seal member extending through said slot and projecting above the surface of said first leg.

5. Means for providing a flat watertight foldable cover for cargo space of a truck having an uncovered cargo space surrounded by upstanding front and side panels and a pivoted rear door, said cover comprising: a plurality of panels pivotally connected to fold accordion-style about hinges extending transversely of the cargo space, said hinges being secured to the vertical edges of abutting pairs of said panels; a seal for said hinges, said seal being an elongated strip of flexible material forming a pair of legs integrally joined by a web extending around the edge of the hinge having the pivot pin and between the hinge and each of the panels to which the hinge is secured, the longitudinal edges of the web remote from the pivot pin being folded toward each other to seat over the edges of the legs of the hinge to positively hold the seal in place against the tension generated by the web being pulled around the pivot end of the hinge as the panels are pivoted to folded position.

6. Means as described in claim 5 wherein the legs of said seal are clamped between the legs of said hinges and the adjacent edges of said panels to positively hold the seal in place.

7. An L-shaped member for forming part of a seal for a truck cargo bay cover, said member being generally L-shape in cross section and having first and second legs, said first one of which is adapted to be seated against a generally horizontal surface of the sides of the cargo, said one leg having recessed means extending lengthwise thereof to seat a gasket, a gasket of resilient material having a seal forming flange and a base flange secured to said one leg of said member with its base flange seated in said recessed means and being anchored to said one leg; said seal forming flange of said seal extending upwardly from said base flange at an angle less than 90° toward the other of said legs of said member whereby when depressed by a cover it forms a barrier to moisture, entry into said cargo bay.

8. The L-shaped member described in claim 7 wherein said second leg of said member is inclined toward the first leg thereof at a minor angle to deflect wind currents approaching said member generally parallel to the plane of said first leg thereof.

9. The L-shaped member described in claim 8 wherein the top edge of said second leg has an enlarged bead extending the length thereof to stiffen it.

* * * * *